United States Patent
Liu

(10) Patent No.: US 12,411,226 B2
(45) Date of Patent: Sep. 9, 2025

(54) POSITION DETERMINATION WITH REFLECTING SURFACES

(71) Applicant: ZTE Corporation, Shenzhen (CN)

(72) Inventor: Ruiqi Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 370 days.

(21) Appl. No.: 18/099,623

(22) Filed: Jan. 20, 2023

(65) Prior Publication Data

US 2023/0266458 A1    Aug. 24, 2023

Related U.S. Application Data

(63) Continuation of application No. PCT/CN2020/113897, filed on Sep. 8, 2020.

(51) Int. Cl.
  *G01S 13/75* (2006.01)
  *G01S 13/87* (2006.01)

(52) U.S. Cl.
  CPC .......... *G01S 13/751* (2013.01); *G01S 13/876* (2013.01)

(58) Field of Classification Search
  CPC .... G01S 13/751; G01S 13/876; G01S 5/0273; G01S 13/878; G01S 13/765; H04B 7/04013
  USPC ...................................................... 455/456.1
  See application file for complete search history.

(56) References Cited

U.S. PATENT DOCUMENTS

| | | | |
|---|---|---|---|
| 2008/0170559 A1* | 7/2008 | Zumsteg | H04J 3/0682 370/350 |
| 2017/0026147 A1* | 1/2017 | Smith | G01S 13/878 |
| 2017/0082729 A1* | 3/2017 | Bar-Shalom | G01S 5/12 |
| 2017/0228692 A1* | 8/2017 | Pargoe | G06Q 10/0832 |
| 2018/0081094 A1* | 3/2018 | Aikin | G08G 1/017 |
| 2018/0275276 A1* | 9/2018 | Ngai | G01S 17/42 |
| 2019/0072638 A1* | 3/2019 | Wang | H04W 4/029 |
| 2019/0223136 A1* | 7/2019 | Miermont | G01S 13/825 |
| 2019/0394748 A1 | 12/2019 | Al-Kadi et al. | |
| 2019/0394784 A1* | 12/2019 | Li | H04B 17/309 |
| 2020/0127784 A1* | 4/2020 | Akkarakaran | H04W 72/044 |
| 2020/0250352 A1* | 8/2020 | Wodrich | G01S 5/14 |

(Continued)

FOREIGN PATENT DOCUMENTS

| | | | | |
|---|---|---|---|---|
| CN | 103809184 A | * | 5/2014 | ............. G01S 17/42 |
| CN | 104105198 A | * | 10/2014 | |

(Continued)

OTHER PUBLICATIONS

Office Action issued in Chinese Patent Application No. 202080104906.1 dated Aug. 17, 2024, w/English Translation, 45 pages.

(Continued)

*Primary Examiner* — Mahendra R Patel
(74) *Attorney, Agent, or Firm* — Crowell & Moring LLP

(57) ABSTRACT

This document generally relates to use of intelligent reflecting devices for positioning in wireless communication systems, which may increase the coverage for a wireless access node or base station. During a positioning session, an intelligent reflecting device may reflect a signal to a receiving node. An identity of the intelligent reflecting device may be determined, and a position of the receiving node may be determined based on the identity of the intelligent reflecting device.

19 Claims, 5 Drawing Sheets

(56) References Cited

U.S. PATENT DOCUMENTS

| | | | | |
|---|---|---|---|---|
| 2020/0380178 A1* | 12/2020 | Santarone | ................ | G01S 3/48 |
| 2021/0302561 A1* | 9/2021 | Bayesteh | ................ | G01S 13/42 |
| 2024/0031980 A1 | 1/2024 | Duan et al. | | |

FOREIGN PATENT DOCUMENTS

| | | | | | |
|---|---|---|---|---|---|
| CN | 110174644 A | * | 8/2019 | ............... | G01S 5/18 |
| CN | 111050277 A | | 4/2020 | | |
| CN | 111181662 A | | 5/2020 | | |
| CN | 111245494 A | | 6/2020 | | |
| CN | 111983560 A | | 11/2020 | | |
| CN | 115699603 A | * | 2/2023 | ........... | H04B 7/1555 |
| CN | 116940858 A | | 10/2023 | | |
| GB | 2405760 A | * | 3/2005 | ........... | G01S 13/878 |
| GB | 2551347 A | * | 12/2017 | ............... | G01S 5/14 |
| GB | 2561238 A | * | 10/2018 | ............... | B64G 3/00 |
| JP | 6957496 B2 | * | 11/2021 | ........... | G06Q 10/083 |
| WO | WO-2010086839 A1 | * | 8/2010 | ............... | G01S 7/35 |
| WO | WO 2020/096506 A1 | | 5/2020 | | |

OTHER PUBLICATIONS

International Search Report and Written Opinion for International Application No. PCT/CN2020/113897 mailed May 31, 2021 (6 pages).

Muhammad Fayyaz, et al., Localization of Mobile Transmitting Devices in Non Line-of-Sight (NLOS) Multipath Environments Using MIMO Radar Technology, 2014 IEEE Symposium on Wireless Technology and Applications (ISWTA), IEEE, Sep. 28, 2014 (6 pages).

Jingwen Zhang, et al., Positioning with Dual Reconfigureable Intelligent Surfaces in Millimeter-Wave MIMO Systems, 2020 IEEE/CIC International Conference on Communications in China (ICCC), IEEE, Aug. 9, 2020 (16 pages).

Henk Wymeersch, et al., Radio Localization and Mapping with Reconfigurable Intelligent Surfaces, arxiv.org, Cornell University Library, Ithaca, NY, Dec. 19, 2019 (7 pages).

European Extended Search Report for Application No. 20952671.4 mailed Dec. 7, 2023 (16 pages).

Liu et al., "Angle of Arrival Based Positioning Method in Single Frequency Networks"; IEEE, 2018 (5 pages).

Liu et al., "TDoA Positioning in Single Frequency Networks Without Transmitter Identities". IEEE. 2019 (5 pages).

Liu et al., "Line of Sight Component Identification and Positioning in Single Frequency Networks Under Multipath Propagation", IEEE Transactions on Broadcasting, vol. 65, No. 2, Jun. 2019, 99. 220-233 (14 pages).

Zhao et al., "A Survey of Intelligent Reflecting Surfaces (IRSs): Towards 6G Wireless Communication Networks", arXiv: 1907.04789v3 [eess.SP], Nov. 2, 2019 (7 pages).

\* cited by examiner

POSITION DETERMINATION WITH REFLECTING SURFACES

CROSS-REFERENCE TO RELATED APPLICATIONS

This application is a continuation of International Application No. PCT/CN2020/113897, filed Sep. 8, 2020. The contents of International Application No. PCT/CN2020/113897 are herein incorporated by reference in their entirety.

TECHNICAL FIELD

This document is directed generally to intelligent reflecting devices in wireless communications.

BACKGROUND

Wireless positioning has become one of the fundamental functions of wireless communication systems. From 3G to 4G to 5G, most commercial communication systems support positioning services to allow a position of a communication node to be determined. Current positioning services may only utilize base stations. However, if communication nodes other than base stations are used for wireless communication with user devices, ways incorporate such nodes into the positioning services may be desirable.

SUMMARY

This document relates to methods, systems, apparatuses and devices for use of intelligent reflecting devices to determine positions of nodes in wireless communications.

In some implementations, a method for wireless communication is disclosed. The method may include: receiving, by a receiving node, a signal reflected by an intelligent reflecting device; determining, by a source identification node, an identity of the intelligent reflecting device based on the signal after being reflected by the intelligent reflecting device; and identifying, by a position determination node, a position of a target node based on the identity of the intelligent reflecting device.

In some other implementations, a system including one or more network devices is disclosed. The one or more network devices may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causes the one or more processors to implement any one of the methods above.

The above and other aspects and their implementations are described in greater detail in the drawings, the descriptions, and the claims.

DETAILED DESCRIPTION

The present description describes wireless communications involving one or more intelligent reflecting devices used to determine positions of target nodes of a wireless communication network. Utilizing one or more intelligent reflecting devices to determine positions may allow fewer base stations to be needed in positioning sessions. This, in turn, may free up base station resources for other wireless communication tasks since the base stations will not needed for positioning sessions. Another advantage of utilizing intelligent reflecting devices for positioning is that additional line-of-sight (LOS) paths are created. LOS paths are critical for determining positions since absolute distances between communication nodes is necessary for position calculations. If objects are blocking direct paths between two communication nodes, an intelligent reflecting device can provide a new or additional LOS path for signal propagation that, in turn, can be used for position determinations. These and other technical improvements, advantages, and benefits will become apparent in view of the further detailed description and the accompanying drawings.

Figure 1:
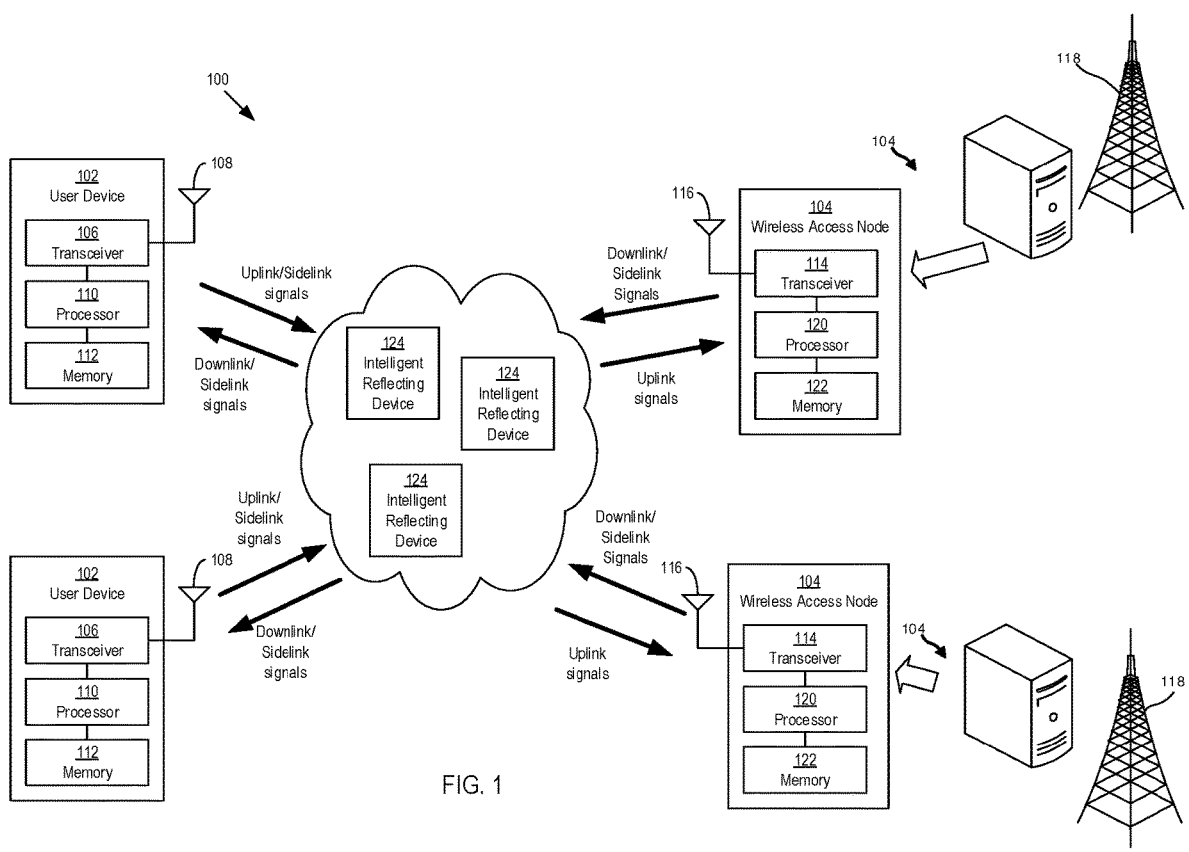
FIG. 1 shows a block diagram of an example of a wireless communication system.

FIG. 1 shows a diagram of an example wireless communication system 100 including a plurality of communication nodes that are configured to wirelessly communicate with each other. The communication nodes may be used to determine positions of receiving nodes, as described in further detail below.

The communication nodes include at least one user device 102 and at least one wireless access node 104. The example wireless communication system 100 in FIG. 1 is shown as including two user devices 102 and two wireless access nodes 104. However, various other examples of the wireless communication system 100 that include any of various combinations of one or more user devices 102 and/or one or more wireless access nodes 104, including only one user device 102 and only one wireless access node 104, only one user device 102 and two or more wireless access nodes 104, two or more user devices 102 without any wireless access nodes 104, two or more user devices 102 and one or more wireless access nodes 104, or two or more wireless access nodes 104 without any user devices 102.

The user device 102 may include a single electronic device or apparatus, or multiple (e.g., a network of) electronic devices or apparatuses, capable of communicating wirelessly over a network. A user device may comprise or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing devices that are not ordinarily moved for long periods of time, such as appliances, other relatively heavy devices including Internet of things (IoT), or computing devices used in commercial or industrial environments, as non-limiting examples). In various embodiments, a user device 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, a wireless access node 104 may also include a single electronic device or apparatus, or multiple (e.g., a network of) electronic devices or apparatuses, and may comprise one or more base stations or other wireless network access points capable of communicating wirelessly over a network with one or more user devices and/or with one or more other wireless access nodes 104. For example, the wireless access node 104 may comprise a 4G LTE base station, a 5G NR base station, a 5G central-unit base station, a 5G distributed-unit base station, a next generation Node B (gNB), an enhanced Node B (eNB), or other base station, in various embodiments. A wireless access node 104 may include transceiver circuitry 114 coupled to an antenna 116, which may include an antenna tower 118 in various approaches, to effect wireless communication with the user device 102 or another wireless access node 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

In various embodiments, two communication nodes in the wireless system 100—such as a user device 102 and a wireless access node 104, two user devices 102 without a wireless access node 104, or two wireless access nodes 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a sending node or a sending device, the second node may be referred to as a receiving node or a receiving device, and the communication may be considered a transmission for the first node and a reception for the second node. Of course, since communication nodes in a wireless system 100 can both send and receive signals, a single communication node may be both a sending node/device and a receiving node/device simultaneously or switch between being a sending node/device and a receiving node/device.

Also, particular signals can be characterized or defined as either an uplink (UL) signal, a downlink (DL) signal, or a sidelink (SL) signal. An uplink signal is a signal transmitted from a user device 102 to a wireless access node 104. A downlink signal is a signal transmitted from a wireless access node 104 to a user device 102. A sidelink signal is a signal transmitted from a first user device 102 to a second user device 102, or a signal transmitted from a first wireless access node 104 to a second wireless access node 104.

In addition, another type of communication node is an intelligent reflecting device 124. The wireless communication system 100 may include, or be in communication with, a network of one or more intelligent reflecting devices 124. As used herein, an intelligent reflecting device is a device having a surface that can reflect a signal, and that has a variable magnitude of reflection. An intelligent reflecting device, and/or the intelligent reflecting device's surface, may also, or otherwise, be referred to as an intelligent reflecting surface (IRS), a large intelligent surface (LIS), a large intelligent metasurface (LIM), a smart reflect-array, a reconfigurable intelligent surface (RIS), a software-defined surface (SDS), a software-defined metasurface (SDM), a passive intelligent surface (PIS), or a passive intelligent mirror.

In general, a surface of an intelligent reflecting device receives an incident signal and reflects the incident signal. The signal that the surface outputs in response to, or as a result of the reflection is referred to as a reflected signal. In other words, a reflected signal is a reflected version of an incident signal reflected by a surface.

In addition, a surface of an intelligent reflecting device may be configured to reflect an incident signal with a magnitude of reflection. In general, a magnitude of reflection is or indicates an amount of power of the incident signal that the surface reflects. The magnitude of reflection may be a value in units of power (such as Watts), or may be represented as a percentage or a fraction of the power of the incident signal. A surface of the intelligent reflecting device can dynamically change its magnitude of reflection such that it is capable of having different magnitudes of reflection at different times.

A surface of an intelligent reflecting device has a variable magnitude of reflection by being configured to change between at least two magnitudes of reflection. For example, the surface may reflect with a maximum magnitude of reflection and a minimum magnitude of reflection. When a surface is reflecting with a maximum magnitude of reflection, the surface reflects as much power of the incident signal as it is capable of reflecting. In various embodiments, when a surface is reflecting with a maximum magnitude of reflection, the surface reflects all or substantially all of the power of the incident signal, such that the reflected signal has 100%, or substantially 100%, (e.g., a percentage slightly less than 100% resulting from unavoidable power loss, such as due to inherent properties of the surface, e.g., dielectric loss, metallic loss, or ohmic loss, as non-limiting examples) of the power of the incident signal. In other embodiments, when a surface is reflecting with a maximum magnitude of reflection the surface outputs a reflected signal with more power than the power of the incident signal—i.e., greater than 100% of the power of the incident signal. For such other embodiments, the surface is configured to amplify the incident signal and/or output an amplified version of the incident signal. Also, when a surface is reflecting with a minimum magnitude of reflection, the surface absorbs as much power of the incident signal as it is capable of absorbing. In various embodiments, when a surface is reflecting with a minimum magnitude of reflection, the surface absorbs all or substantially all of the power of the incident signal, such that none, or substantially none, of the power of the incident signal is reflected.

In addition, in various embodiments, a surface of an intelligent reflecting device is configured to reflect an incident signal with one or more intermediate magnitudes of reflection in between maximum and minimum magnitudes of reflection. For example, a surface may be configured to output a reflected signal with any of various percentages in between 0% and 100% of the power of the incident signal, such as 25%, 50%, or 75%, as non-limiting examples. For such embodiments, a surface of an intelligent reflecting device may change from reflecting between a maximum magnitude of reflection and an intermediate magnitude of reflection, between a minimum magnitude of reflection and an intermediate magnitude of reflection, and/or between different intermediate magnitudes of reflection.

Also, the magnitude of reflection of the surface may be inversely related to a magnitude of absorption of the surface, which may be or indicate an amount of power of the incident signal that the surface absorbs. In general, power of an incident signal that a surface absorbs is power that the surface does not reflect. Accordingly, the higher a surface's magnitude of absorption, the lower its magnitude of reflection.

Figure 2A:
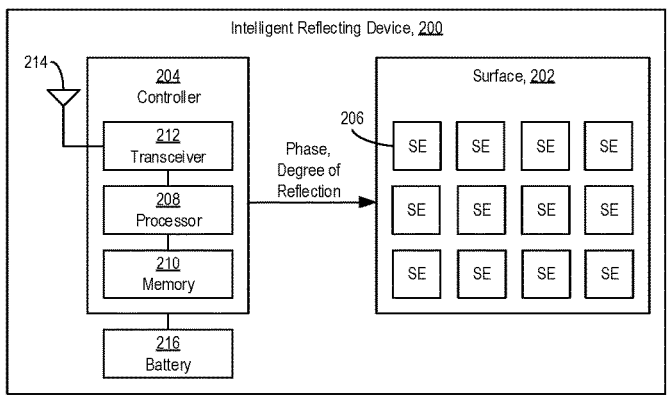
FIG. 2A shows a block diagram of an example intelligent reflecting device.

In further detail, FIG. 2A shows a block diagram of an example configuration of an intelligent reflecting device 200, which is representative of an example configuration of an intelligent reflecting device 124 in FIG. 1. The intelligent reflecting device 200 includes a surface 202 and a controller 204. The surface 202 includes a plurality of surface elements (SE) (also called surface units (SU)) 206. A surface element 206 is a portion of the surface 202 with an associated variable (or dynamically changeable) magnitude of reflection. Accordingly, magnitudes of reflection of different surface elements 206 of the same surface 202 can be independently controlled and/or changed, such that at any given point in time, the different surface elements 206 can have the same or different magnitudes of reflection. In turn, the surface 202, at a given point in time, may have an overall or combined magnitude of reflection that corresponds to, and/or that is based, on a combination of the magnitudes of reflection of the surface elements 206 of the surface 202 at that given point in time.

A surface element 206, as described herein, may have any of various configurations, and/or may be made of any of various materials, that enable it to have a variable and controllable magnitude of reflection. In addition, the controller 204 may be configured to control and/or change the magnitude of reflection of a surface element 206 in any of various ways, such as through output of one or more control signals and/or by changing an electrical bias, such as a voltage or a current, applied to the surface element 206, as non-limiting examples. Through its control, the controller 204 may, in turn, change a feature of the surface element 206, such as a material property and/or an electrical characteristic, upon which the surface element's magnitude of reflection depends. As a non-limiting example, a surface element 206 may be configured with a variable resistance, and a change in value of the variable resistance changes an amount of power that the surface element 206 absorbs, in turn changing the magnitude of reflection of the surface element 206. Accordingly, the controller 204 may correspondingly set the resistance value of the variable resistance in order to configure the surface element with a desired magnitude of reflection. Additionally, when the controller 204 wants to change the magnitude of reflection, it correspondingly changes the resistance value that yields the new desired magnitude of reflection. Ways other than, or in combination with, a variable resistance may be used to provide a surface element 206 with a variable magnitude of reflection.

The controller 204 may configure the surface 202 with, or to have, a maximum magnitude of reflection, a minimum magnitude of reflection, or an intermediate magnitude of reflection, at any given point in time during operation. To configure the surface 202 with the maximum magnitude of reflection, the controller 204 may control the surface elements 206 so that all of the surface elements 206 are configured to reflect with their respective maximum magnitudes of reflection. Similarly, to configure the surface 202 with the minimum magnitude of reflection, the controller 204 may control the surface elements 206 so that all of the surface elements 206 are configured to reflect with their respective minimum magnitudes of reflection.

In addition, to configure the surface 202 with an intermediate magnitude of reflection, the controller 204 may control the surface elements 206 such that at least one of the surface elements 206 is configured with an associated minimum or intermediate magnitude of reflection and less than all of the surface elements 206 are configured with their associated minimum magnitudes of reflection. Various ways of configuring the surface 202 with an intermediate magnitude of reflection may be possible, and may depend on the percentage of the intermediate magnitude of reflection, and the granularity of the magnitudes of reflection with which an individual surface element 206 may be configured. In general, when considered in combination, the surface elements 206 may have an average magnitude of reflection, which is an average of the individual magnitudes of reflection, and which may determine the magnitude of reflection of the surface 202. Accordingly, the controller 204 may configure a certain number of surface elements 206 with a maximum magnitude of reflection, a minimum magnitude of reflection, or certain intermediate magnitudes of reflection that, in turn, yield an average magnitude of reflection corresponding to a desired intermediate magnitude of reflection for the surface 202. As brief, non-limiting examples, to configure the surface 202 with an intermediate magnitude of reflection of 50%, the controller 204 may configure half of the surface elements 206 with a maximum magnitude of reflection and the other half of the surface elements 206 with a minimum magnitude of reflection, or may configure all of the surface elements 206 with respective 50% intermediate magnitudes of reflection, or may configure half of the surface elements 206 with respective 75% intermediate magnitudes of reflection and the other half with 25% intermediate magnitudes of reflection. Various ways of configuring the surface elements 206 with some combination of a maximum magnitude of reflection, a minimum magnitude of reflection, and one or more intermediate magnitudes of reflection, in order to achieve a desired average or overall intermediate magnitude of reflection for the surface 202 may be possible.

Figure 2B:
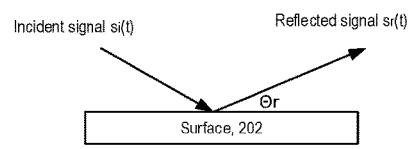
FIG. 2B shows a diagram of a surface of an intelligent reflecting device reflecting an incident signal.

Referring back to FIG. 2A and also to FIG. 2B, a surface 202 of an intelligent reflecting device 200 may also have a variable angle of reflection (or reflection angle). To have a variable reflection angle, each surface element 206 may have an associated variable phase shift with which it reflects an incident signal $s_i(t)$ to output a reflected signal $s_r(t)$. In turn, the combination of the phase shifts of the individual surface elements 206 determines a reflection angle $\Theta_r$ at which the surface 202 outputs a reflected signal $s_r(t)$. Accordingly, changing one or more phase shifts changes the reflection angle $\Theta_r$. In this way, by setting and changing the phase shifts, the surface 202 performs beam forming by changing the reflection angle $\Theta_r$ in order to dynamically direct reflected signals in certain directions.

Additionally, in general, at any given point in time, the surface elements 206 a surface 202 of an intelligent reflecting device 200 may be divided, separated, or organized into portions or groups of surface elements, such that each surface element portion includes one or more surface elements 206. Each surface element portion may have its own associated variable magnitude of reflection and/or variable angle of reflection with which it reflects signals. The controller 204 may be configured to independently control the different surface element portions, including independently setting and/or adjusting the magnitudes of reflection and the angles of reflection of the different surface element portions. In doing so, at any given moment in time duration operation, any given two surface element portions may have the same or different magnitudes of reflection and/or reflection angles as each other.

Figure 2C:
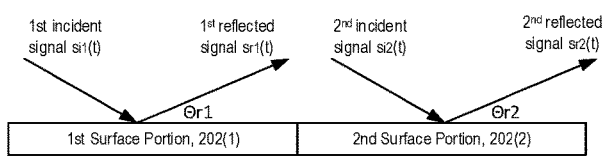
FIG. 2C shows a diagram of a surface reflecting with multiple reflection angles.

FIG. 2C shows an example embodiment, where a surface 202 is separated or divided into two portions, including a first surface portions 202(1) and a second surface portion 202(2). The first portion 202(1) is configured to reflect a first incident signal $s_{i1}(t)$ to output a first reflected signal $s_{r1}(t)$ with an associated magnitude of reflection and a first reflection angle $\Theta_{r1}$, and the second portion 202(2) is configured to reflect a second incident signal $s_{i2}(t)$ to output a second reflected signal $s_{r2}(t)$ with an associated magnitude of reflection and a second reflection angle $\Theta_{r2}$. The controller 204 may control the surface elements to have associated magnitudes of reflections so that the portions 202(1), 202(2) have certain associated magnitudes of reflection. Additionally, the controller 204 may control the phase shifts of the surface elements 206 so that the portions 202(1), 202(2) reflect with certain reflection angles $\Theta_{r1}$, $\Theta_{r2}$. Other configurations where the surface 202 is divided into more than two surface element portions, each configured with their own magnitude of reflection and reflection angle, is possible.

Referring particularly to FIG. 2A, the controller 204 is configured to control the surface 202 and surface elements 206. The controller 204 may control the surface 202 and the surface elements 206 by setting and/or changing the magnitude of reflection of the surface 202, including the magnitudes of reflection of the surface elements 206, and/or by setting and/or changing the angle of reflection of the surface 202, including the phase shifts of the surface elements 206. Similar to the communication nodes in FIG. 1, the controller 204 may include a processor 208 and a memory (or other storage device) 210. In various embodiments, the memory 210 may store therein instructions or code that, when read and executed by the processor 208, cause the processor 208 to implement various ones of the methods described herein. In addition or alternatively, the memory 210 may store one or more reflection schemes to control the surface 202 and the surface elements 206. Details of reflection schemes are described in further detail below.

Additionally, for at least some example configurations, the controller 204 includes transceiver circuitry 212 coupled to an antenna 214. The transceiver circuitry 212 may also be coupled to the processor 208 and/or to the memory 210. For at least some of these example configurations, and/or for other example configurations, the controller 204 includes one or more connectors configured to connect to electrical wires or cabling, which are also connected to other devices or communication nodes. Accordingly, in various embodiments, an intelligent reflecting device can externally communicate with one or more communication nodes, such as by transmitting and receiving signals, wirelessly, though wires, or a combination thereof.

In particular example configurations, the controller 204 may control the surface 202 and the surface elements 206 according to a predetermined reflection scheme that indicates how the controller is to configure the magnitude of reflection of the surface 202 and/or the magnitudes of reflection of the surface elements 206. The predetermined reflection scheme may do so by indicating to the controller 204 the magnitudes of reflection with which to configure each of the surface elements 206. For some example configurations, the reflection scheme may expressly or directly provide the indication, such as by expressly identifying a magnitude of reflection for each surface element 206. In other example configurations, the predetermined reflection scheme may implicitly or indirectly provide the indication. For example, the reflection scheme may indicate a certain magnitude of reflection for the surface 202, and the controller 204 may be configured to convert that certain magnitude to a corresponding magnitudes of reflection for each of the surface elements 206, such as by being configured with an algorithm or a mapping that provides a correspondence between various magnitudes of the surface 202 and various magnitudes of reflection for the individual surface elements 206. As another example, the reflection scheme may indicate a number of surface elements 206 to have the maximum magnitude of reflection, a number of surface elements 206 to have the minimum magnitude of reflection, and/or a number of surface elements 206 to have certain intermediate magnitudes of reflection, and based on this information, the controller 204 determines magnitudes of reflection for each of the surface elements 206.

In addition or alternatively, in various embodiments, a reflection scheme may indicate a pattern for the surface elements 206. As non-limiting examples, a reflection scheme may indicate that all of the surface elements 206 in a same predetermined portion, such as a same row or a same column, are to be configured with the same magnitude of reflection. In addition or alternatively, a pattern may indicate that adjacent rows or adjacent columns of surface elements 206 are to have different magnitudes of reflection—i.e., that rows or columns of surface elements are to alternate between maximum and minimum magnitudes of reflection. Other example patterns may indicate that adjacent surface elements 206 in the same row or the same column are to have different magnitudes of reflection. In particular example configurations, the pattern indicates that at least a portion of the surface elements 206 are to have maximum and minimum magnitudes of reflection in a checkered arrangement Various other example patterns may be possible.

In addition or alternatively, in various embodiments, a reflection scheme may have a temporal component that indicates one or more magnitudes of reflection for the surface 202 for one or more time periods. Based on the temporal component, the controller 204 may determine a start time and a time duration for which it to configure the surface elements 206 with certain magnitudes of reflection indicated by the surface scheme. In particular example configurations, a surface scheme indicates a plurality of magnitudes of reflection and a plurality of time periods, and associates each magnitude of reflection with one of the time periods. To illustrate, a surface scheme may indicate two magnitudes of reflection, including a high magnitude of reflection and a low magnitude of reflection, and may also indicate two time periods, including a first time period followed by a second time period. In general, the high magnitude of reflection has a higher magnitude or a higher percentage than the low magnitude of reflection. For example, the high magnitude of reflection may be the maximum magnitude of reflection or an intermediate magnitude of reflection, and the low magnitude of reflection may be the minimum magnitude of reflection or an intermediate magnitude of reflection. If the high magnitude and low magnitude of reflection are both intermediate magnitudes of reflection, then the high magnitude of reflection corresponds to a higher percentage than the low magnitude of reflection. The surface scheme may indicate to the controller 204 to configure the surface elements 206 according to the high magnitude of reflection during the first time period, and to configure the surface elements 206 according to the low magnitude of reflection during the second time period.

In addition or alternatively, in various embodiments, a temporal component of a reflection scheme may indicate a first set of time periods and a second set of time periods. The reflection scheme may indicate to configure the surface elements 206 according to the high magnitude of reflection during the time periods of the first set, and to configure the surface elements 206 according to the low magnitude of reflection during the time periods of the second set. In particular example configurations, the first and second set of time periods are interleaved between each other, causing the controller 204 to alternatingly configure the surface elements 206 with the high magnitude of reflection for the first time period and with the low magnitude of reflection for the second time period. In various configurations, the first time period may be equal to the second time period, may be longer than the second time period, or may be shorter than the second time period.

Also, reflection schemes that identify more than two magnitudes of reflection and/or more than two time periods or two sets of time periods may be possible. For example, a surface scheme may indicate three magnitudes of reflection and three or more time periods in which the controller 204 is to configure the surface elements 206 according to the three magnitudes of reflection.

FIGS. 3A-3F show timing diagrams of an incident signal $s_i(t)$ (FIG. 3A) and various non-limiting examples of types of reflected signals $s_r(t)$ (FIGS. 3B-3F) that the surface 202 may output based on different temporal components of a reflection scheme. For simplicity, the reflection schemes illustrated in FIGS. 4B-4F indicate two magnitudes of reflection, including a high magnitude of reflection and a low magnitude of reflection, according to which the controller 204 configures the surface elements 206 while reflecting the incident signal $s_i(t)$. In the figures, the power of the reflected signal $s_r(t)$ when the surface elements 206 are configured with the high magnitude of reflection are denoted by an associated amplitude Y1, and the power of the reflected signal $s_r(t)$ when the surface elements 206 are configured with the low magnitude of reflection are denoted by an associated amplitude Y2.

Figure 3A:
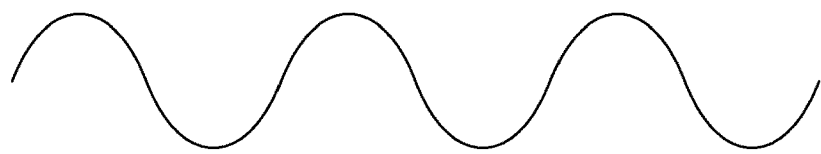
FIG. 3A shows a timing diagram of an example an incident signal.
Figure 3B:
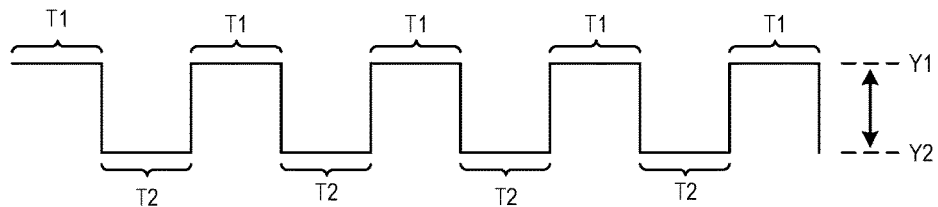
FIG. 3B shows a timing diagram of an example of a reflected signal, with a frequency greater than a frequency of the incident signal of FIG. 3A and about a 50% duty cycle.
Figure 3C:
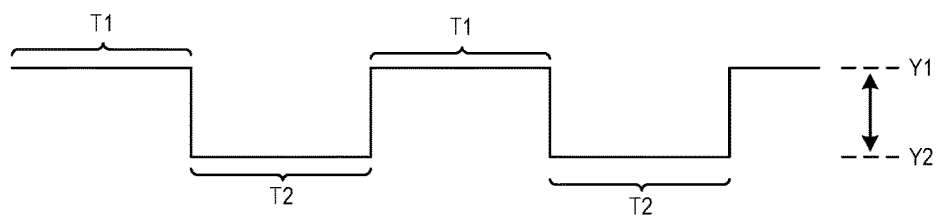
FIG. 3C shows a timing diagram of another example of a reflected signal, with a frequency less than a frequency of the incident signal of FIG. 3A and about a 50% duty cycle.
Figure 3D:
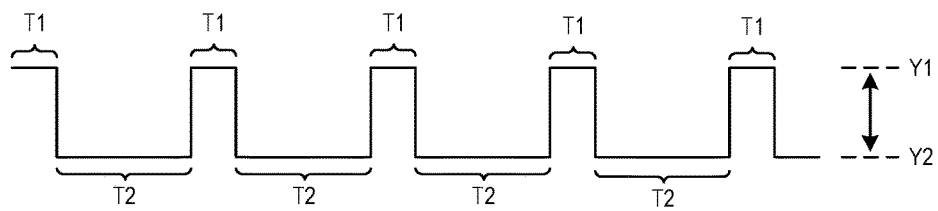
FIG. 3D shows a timing diagram of another example of a reflected signal, with a duty cycle less than 50%.
Figure 3E:
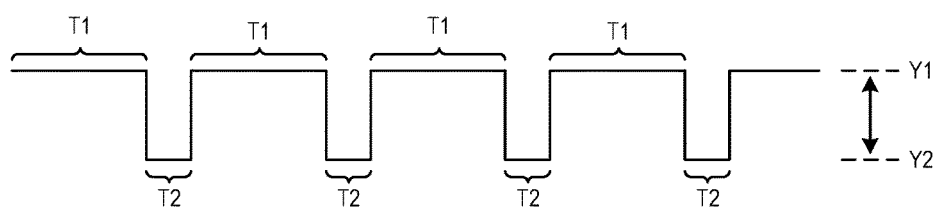
FIG. 3E shows a timing diagram of another example of a reflected signal, with a duty cycle greater than 50%.
Figure 3F:
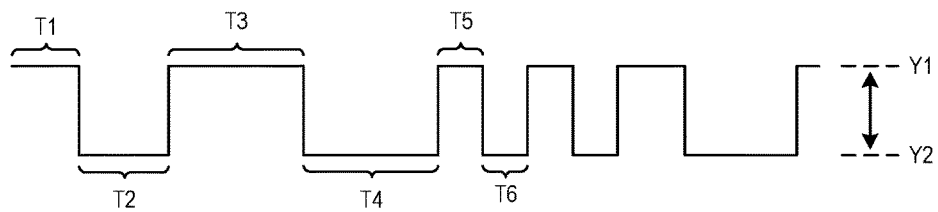
FIG. 3F shows a timing diagram of another example of a reflected signal, with a varying frequency and/or duty cycle.

Further, FIG. 3B-3E each show associated two sets of time periods T1 and T2 over which a reflected signal $s_r(t)$ propagates. The surface elements 206 reflect the incident signal $s_i(t)$ with the high magnitude of reflection during the first set of time periods T1, and the reflect the incident signal $s_i(t)$ with the low magnitude of reflection during the second set of time periods T2. With respect to FIGS. 3B and 3C, the time periods T1 and T2 are about equal to each other, resulting in a generally constant frequency and about 50% duty cycle. FIGS. 3B and 3C also show that the time periods T1 and T2 can be lengthened or shortened, resulting in different lower or higher frequencies for the reflected signal $s_r(t)$. FIG. 3D shows a temporal component of a reflection scheme indicating first time periods T1 shorter than second time periods T2, resulting in a reflected signal $s_r(t)$ with a generally constant frequency and a duty cycle less than 50%. FIG. 3E shows a temporal component of a reflection scheme indicating first time periods T1 longer than second time periods T2, resulting in a reflected signal $s_r(t)$ with a generally constant frequency and a duty cycle greater than 50%. FIG. 3F shows a temporal component of a reflection scheme indicating different durations for different time periods associated with the high and low magnitudes of reflection, resulting in a reflected signal $s_r(t)$ with a frequency and/or duty cycle that varies with time.

In general, a surface 202 of an intelligent reflecting device 200 is configured to output a reflected signal that has at least one corresponding characteristic that is different from that of the incident signal. In this context, the reflected signal may also be referred to as a modulated signal, in that it is has at least one characteristic that is different from that of the incident signal due to the reflection performed by the surface 202. Example characteristics include energy, power, frequency, and duty cycle. For example, when the surface 202 reflects an incident signal with one or more surface elements 206 configured with an intermediate or minimum magnitude of reflection, the reflected signal may have a different (i.e., lower) energy and/or power than the energy and/or power of the incident signal. As another example, depending on how the controller 204 controls the surface elements 206 according to a given reflection scheme, the surface 202 may output a reflected signal with a different frequency than the frequency of the incident signal, such as a higher frequency as depicted in FIG. 3A, or a lower frequency as a depicted in FIG. 3B. Similarly, in various embodiments where the incident signal has a duty cycle, the surface 202 may output a reflected signal with a different duty cycle (higher or lower) than the duty cycle of the incident signal, depending on the reflection scheme used by the controller 204.

Additionally, for at least some example embodiments, a surface 202 of an intelligent reflecting device 200 may be separated or divided into multiple independently controlled sections, as previously described with reference to FIG. 2C. For such embodiments, each section may be associated with a corresponding reflection scheme. For example, with respect to FIG. 2C, the controller 204 may configure the first surface portion 202(1) to reflect according to a first reflection scheme, and may configure the second surface portion 202(2) to reflect according to a second reflection scheme. The different reflection schemes may cause the different portions to output respective reflected signals with the same characteristics, or with at least one characteristic (e.g., frequency, power, or duty cycle) that is different from each other. The different characteristics may indicate or identify different portions of the intelligent reflecting device 200.

Referring back to FIG. 1, one of the communication nodes in the wireless system 100 may send a signal to another one of the communication nodes, such as in the form of a downlink signal, an uplink signal, or a sidelink signal, as previously described. The path that the signal takes from the sending device to the receiving device is referred to as a propagation path. In the event that an intelligent reflecting device 124 is in the propagation path of a signal, a surface of the intelligent reflecting device 124 may reflect the signal before it reaches the receiving device.

A receiving device (such as a user device 102 or a wireless access node 104) may be configured to detect whether a received signal was reflected by an intelligent reflecting device 124 prior to receipt. To do so, the receiving device may analyze or determine one or more characteristics of the received signal, and then determine whether the received signal was reflected by an intelligent reflecting device 124. In various embodiments, a processor 110, 120 of the receiving device is configured to sample the received signal, such as at certain times according to clocking, in order to obtain sampled values of the received signal. Additionally, for at least some example embodiments, to detect whether a signal was reflected, the receiving device may be configured to know or identify one or more predetermined characteristics of the original signal as transmitted by the sending device and/or one or more characteristics of a signal if reflected by an intelligent reflecting device 124. Upon determining the actual characteristic(s) of the received signal, the receiving device, such as with its processor, may compare the actual characteristic(s) with the predetermined characteristic(s). The receiving device may determine whether the signal was reflected or not by an intelligent reflecting device based on whether the actual characteristic(s) match (either by exactly matching or by being within an acceptable range of) the predetermined characteristic(s).

As an example illustration, a receiving device may know a frequency of an original signal transmitted from a sending device. Upon receipt of a received signal, the receiving device may measure the frequency of the received signal. If the receiving device determines that the frequency of the received signal matches the frequency of original signal, then the receiving device may determine that the received signal was not reflected by an intelligent reflecting device 124 along the propagation path, in between being transmitted from the sending device and received by the receiving device. As another example illustration, a receiving device may know a frequency of a reflected signal reflected by an intelligent reflecting device 124. Upon receipt of a received signal, the receiving device may measure the frequency of the received signal. If the receiving device determines that the frequency of the received signal matches the frequency of the reflected signal, then the receiving device may determine that the signal was reflected by an intelligent reflecting device 124 along the propagation path, in between being transmitted from the sending device and received by the receiving device.

In addition or alternatively, for at least some example configurations, a receiving device may determine one or more characteristics of an intelligent reflecting device 124 that reflected the signal received by the receiving device. To do so, one or more characteristics of a reflected signal may indicate one or more characteristics of the intelligent reflecting device 124 that reflected the signal. That is, one or more predetermined characteristics of a reflected signal may by associated with one or more characteristics of an intelligent reflecting device 124. In turn, upon receiving a signal, the receiving device may determine one or more characteristics of the received signal, determine whether the one or more characteristics match the one or more predetermined characteristics of a reflected signal, and if they match, determine the one or more associated characteristics of the intelligent reflecting device 124 that reflected the signal before it was received by the receiving device.

An example characteristic of an intelligent reflecting device 124 is an identification (ID) of the intelligent reflecting device. Knowing the ID of the intelligent reflecting device may be particularly useful for environments including multiple intelligent reflecting devices 124 that could possibly be in a propagation path of a signal between communication nodes. Determining the ID may enable the receiving device (or the sending device or other communication nodes in the system 100) to identify which of the multiple intelligent reflecting device 124 reflected the signal. Accordingly, for at least some example configurations where a wireless system 100 includes or is in communication with a plurality of intelligent reflecting devices 124, the intelligent reflecting devices 124 may be configured to output reflect signal with different corresponding characteristics from each other, each uniquely corresponding to their own ID. To illustrate, a first intelligent reflecting device 124 may output a reflected with a first frequency indicating a first ID of the first intelligent reflecting device 124, and a second intelligent reflecting device 124 may output a reflected signal with a second frequency indicating a second ID of the second intelligent reflecting device 124. A receiving device, upon receipt of a received signal, may determine whether the frequency of the received signal matches the first frequency or the second frequency, and in turn determine whether the received signal was reflected by the first intelligent reflecting device having the first ID or the second intelligent reflecting device having the second ID.

In addition, for at least some example configurations, an intelligent reflecting device 124 may be controlled by one or more communication nodes (referred to as a controlling device) in the wireless system 100, such as by a wireless access node 104 or a user device 102. For example, a controlling device may control the magnitude of reflection of a surface 202 or associated magnitudes of reflection for a plurality of surface elements 206 for a given intelligent reflecting device 124. In addition or alternatively, a controlling device may control the reflection scheme(s) that an intelligent reflecting device 124 uses, and/or the times at which the intelligent reflecting device 124 uses certain reflection scheme(s). In addition or alternatively, a controlling device may control, such as by setting or adjusting, a reflection angle of an intelligent reflecting device 124, such as part of a beam sweeping process.

Additionally, for at least some example systems 100, a controlling device may be configured to control multiple intelligent reflecting devices 124. For some examples, a controlling device controls multiple reflecting devices 124 by scheduling transmissions of signals to be reflected by different intelligent reflecting devices 124 during different, non-overlapping time periods. In contrast, if different intelligent reflecting devices 124 reflected respective signals during a common time period, it is possible that the reflected signals could combine before being received by respective receiving devices. The combined signal may have characteristics (frequency, duty cycle, power, etc.) different from characteristics of the individual reflected signals, such that upon receipt, the receiving devices may be unable to detect whether the received signal was reflected by an intelligent reflecting device, and/or one or more characteristics (e.g., an ID) of an intelligent reflecting device that reflected the received signal. Accordingly, scheduling the transmissions of signals reflected by different intelligent reflecting devices 124 in different time slots may avoid undesirably combining such signals. As such, in response to the scheduling, one or more sending devices may transmit a first set of one or more signals to be reflected by a first intelligent reflecting device 124 during a first time period, and may transmit a second set of one or more signals to be reflected by a second intelligent reflecting device 124 during a second time period. The second time period does not overlap with the first time period, and may be sufficiently delayed from an end of the first time period for at least some embodiments, so that one or more reflected signals that were reflected by the first intelligent reflecting device 124 are not combined with, or otherwise interfered by, any reflected signals reflected by the second intelligent reflecting device 124. This way, one or more receiving devices receiving the reflected signals reflected by the first intelligent reflecting device can determine that the signals were reflected and/or one or more characteristics of the first intelligent reflecting device.

Figure 4A:
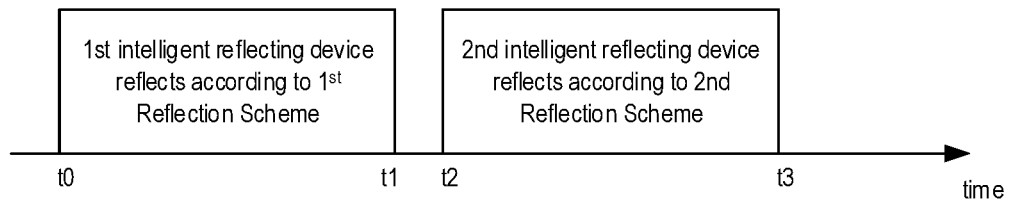
FIG. 4A shows a timing diagram of multiple intelligent reflecting devices reflecting according to respective reflection schemes in non-overlapping time periods.

FIG. 4A illustrates an example of two intelligent reflecting devices reflecting according to respective reflection scheme in different, non-overlapping time periods, such as through control of a controlling device. For example, as indicated in FIG. 4, a first intelligent reflecting device reflects one or more signals according to a first reflection scheme during a first time period extending from a first time t0 to a second time t1. In addition, a second intelligent reflecting device reflects signals according to a second reflection scheme during a second time period extending from a third time t2 to a fourth time t3.

As shown in FIG. 4, the first and second time periods are non-overlapping. Also, for at least some example configurations, such as the one shown in FIG. 4, a predetermined amount of time may extend between time periods. For example, as shown in FIG. 4, a certain, predetermined amount of time may extend between the second time t1 and the third time t2 to prevent against unwanted combining. For other example configurations, one time period may begin at the same time another period ends (e.g., t1 and t2 would be the same in FIG. 4).

Other ways that a communication node may control an intelligent reflecting device 124 may be possible. Additionally, in general, to control an intelligent reflecting device 124, the controlling device may send one or more control signals to the intelligent reflecting device 124, which the controller 204 of the intelligent reflecting device 200 may receive. In various embodiments, the controller 204 of the intelligent reflecting device 200 may be configured to receive the control signals though a wired connection with the controlling device, wirelessly (such as through an antenna 214), or combinations thereof.

In addition, for other example configurations, an intelligent reflecting device 124 is self-controlled, in that the controller 204 determines reflection schemes or otherwise controls its surface 202, the surface elements 206, and/or reflection angles, without being controlled by an external device. For example, the memory 210 of the intelligent reflecting device 200 may be pre-configured with one or more reflection schemes, and the controller 204 is otherwise pre-configured with the ability to control the surface 202 and the surface elements 206 upon manufacture of the intelligent reflecting device, or least before operation, and the controller 204 may exclusively rely on the pre-configuration during its life or period of operation. In various configurations, a self-controlled (or standalone) intelligent reflection device may be configured in difficult-to-access locations, such as the ones previously described. In addition or alternatively, a self-controlled intelligent reflecting device may be configured such that it is not designated for operation with any one particular communication node (e.g., any particular base station), but instead improves coverage for any of various communication nodes that move within a predetermined distance or vicinity of the intelligent reflecting device at various points in time. An intelligent reflecting device configured to output a reflected signal with a characteristic indicating a battery life may be particularly useful for such self-controlled intelligent reflecting devices.

Additionally, for some embodiments, a propagation path between a sending device and a receiving device may include only a single intelligent reflecting device 124, such that a signal communicated over the propagation path is reflected by the single intelligent reflecting device 124, before being received by the receiving device. For other embodiments, a propagation path includes multiple intelligent reflecting devices 124, such that a signal communicated over the propagation path may be reflected by each of the multiple intelligent reflecting devices 124 before received by the receiving device. For example, where a propagation path includes N intelligent reflecting devices 124 (where N is two or more), a signal may be reflected N times by surfaces of the N intelligent reflecting devices 124 before being received by a receiving device. For particular example configurations, each of the multiple intelligent reflecting devices may have a surface that reflects a respective incident signal according to an associated reflection scheme, such that the characteristics of the received signal may be based on, or correspond to, a combination of the multiple reflection schemes.

As with configurations that include only a single intelligent reflecting device in a propagation path, a receiving device receiving a signal that was reflected multiple times by multiple intelligent reflecting devices may have one or more characteristics that are detected by the receiving device. The receiving device may then determine whether the one or more detected characteristics matches one or more predetermined characteristics. If so, the receiving device may determine that the received signal was reflected by at least one intelligent reflecting device, and/or one or more characteristics (e.g., ID or battery life) of at least one of the multiple intelligent reflecting devices that reflected the signal.

Figure 4B:
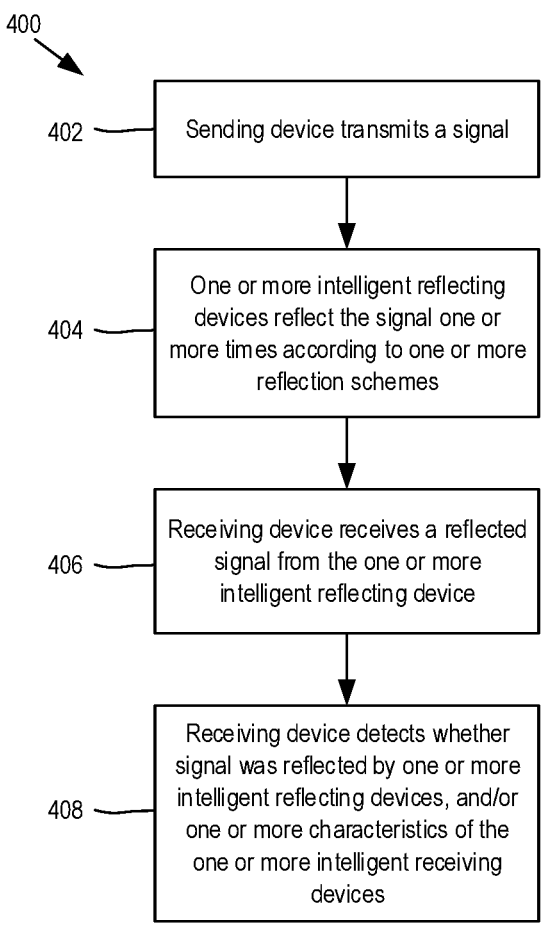
FIG. 4B shows a flow chart of an example method of transmitting a signal over a propagation path that includes one or more intelligent reflecting devices.

FIG. 4B shows a flow chart of an example method 400 of transmitting a signal over a propagation path that includes one or more intelligent reflecting devices. At block 402, the sending device transmits the signal toward a receiving device. At block 404, one or more intelligent reflecting devices reflects the signal one or more times according to one or more reflection schemes. At block 406, the receiving device receives a reflected signal from the one or more intelligent reflecting devices. If the one or more intelligent reflecting devices includes multiple intelligent reflecting devices, then the receiving device may receive the reflected signal from a last intelligent reflecting device that last reflected the signal. At block 406, the receiving device may detect whether the received signal was reflected by an intelligent reflecting device, and/or one or more characteristics of the one or more intelligent reflecting devices that reflected the signal, such as by detecting one or characteristics of the received signal, as previously described. Based on the detection, the receiving device may take one or more actions, as previously described.

Additionally, in various embodiments, one or more reflected signals reflected by one or more intelligent reflecting devices 124 may be used to determine a position of a target node. As used herein, a target node is a node in the wireless communication system 100 for which a position is to be determined. In some embodiments, a target node may be a receiving node that receives a signal that is used to determine the position. In other embodiments, a target node may be a transmitting node that transmits a signal that is used to determine the position. Additionally, as used herein, a position is information that indicates or conveys a physical or geographical position or location (e.g., a geolocation) of a communication node. In some example embodiments, a position includes or indicates one or more coordinates, such as a latitude coordinate or a longitude coordinate. In other example embodiments, a position includes or indicates a cell in a cellular network in which a communication node is located. Other types of positions that position information indicates may be possible.

To determine a position of a target node, the receiving node may receive a reflected signal that is reflected by an intelligent reflecting device. In particular embodiments, the signal that is reflected by the intelligent reflecting device and received by the receiving device may be originally transmitted by a transmitting node. A source identification node may identify the intelligent reflecting device, such as by determining an identity of the intelligent reflecting device that reflected the signal. A position determination node may determine the position of the target node based on the identity of the intelligent reflecting device. In various embodiments, the source identification node and the position determination may be the same node or different nodes, and one or both of the nodes may be the same as, or different from, the target node.

In further detail, in various embodiments, in response the receiving node receiving the reflected signal, the receiving node may determine one or more identifying characteristics of the reflected signal. An identifying characteristic is a characteristic of a signal that is used to identify an intelligent reflecting device that reflected the signal, such as a frequency, a power, or a duty cycle, as previously described. In some example embodiments, the receiving node may also determine one or more positioning characteristics of the reflected signal. A positioning characteristic is a characteristic of a signal that is used in a positioning method to determine or calculate a position. Non-limiting example positioning characteristics include transmission delay (e.g., an absolute or actual transmission delay, a pseudo or relative transmission delay) and an angle of arrival. A position method is a method, or combination of methods, (or methodologies, processes, or algorithms) used to determine a position based on one or more inputs, such as one or more positioning characteristics. Non-limiting example position methods include time of arrival (TOA)-based positioning, time difference of arrival (TDOA)-based positioning, angle of arrival (AOA)-based positioning, single round trip time (single-RTT) measurement, and multiple round trip time (multi-RTT) measurement.

In other example embodiments, the receiving node may only determine one or more identifying characteristics without determining any positioning characteristics, as the identifying characteristic(s) alone may indicate the position. For example, the identity of the reflecting device may, in turn, indicate the cell in which the intelligent reflecting device and/or the target node is located. The indicated cell may provide a relatively rough or estimated location of the target node, and which may be used as the position of the target node. In contrast, using one or more positioning characteristics with one or more of the position methods may provide a set of coordinates or otherwise a more granular or specific location for the target device.

Upon determining one or more identifying characteristics of the reflected signal, a source identification node may determine an identity of the source of the signal. As previously described, different intelligent reflecting devices 124 may output reflected signals with one or more different characteristics. For example, different intelligent reflecting devices 124 may output reflected signals with different frequencies, different powers, different duty cycles, or combinations thereof. A given characteristic, or a given combination of characteristics, may serve as a unique identifier (ID) of a given intelligent reflecting device. In various embodiments, the source identification node may be configured with (e.g., configured to store) a table, database, or other data structure that associates intelligent reflecting devices with an associated signal characteristic or an associated combination of signal characteristics. Accordingly, upon determining one or more identifying characteristics of the reflected signal, the source identification node may identify, such as though use of the database, the identity of the intelligent reflecting device, such as from among a plurality of intelligent reflecting devices, that reflected the signal. For embodiments where the source identification node is different from the receiving node, the receiving node may send the identifying characteristics to the source identification node for the source identification node to identify the intelligent reflecting device.

Upon determining the identity of the intelligent reflecting device 124 that reflected the signal based on at least one identifying characteristic of the reflected signal, a position determination node may determine the position of the target node. For embodiments where the position determination node is a different node than the source identification node, then the source identification node may send the identification of the intelligent reflecting device to the position determination node. The position determination node may determine the position of the target node based on the identity of the intelligent reflecting device. In particular embodiments, the position determination node may determine a position of the intelligent reflecting device that reflected the signal, and may use the position of the intelligent reflecting device, in combination with one or more position characteristics (e.g., transmission delay or angle of arrival as previously described) of the received reflected signal to determine the position.

In some example embodiments, the position determination node may be configured with or have access to a database, a table, or other data structure that associates identities of communication nodes (e.g., wireless access nodes 104, intelligent reflecting devices 124, and/or known user devices 102 (e.g., stationary user devices with fixed positions), and positions (e.g., coordinates or cells). Accordingly, for such embodiments, upon determination of an identity of an intelligent reflecting device, the position determination node may determine the position of the identified intelligent reflecting device using the database. In other example embodiments, the position determination node may receive a signal that indicates the position of a communication node. For example, a sending node (e.g., a wireless access node 104) may transmit a data packet to the position determination node that indicates the positions of one or more communication nodes that have or will be transmitting or reflecting a signal to the receiving node for determination of the position of the target node. In other embodiments, an intelligent reflecting device 124 may reflect a signal with a predetermined reflection scheme such that the reflected signal has a characteristic that identifies the position of the intelligent reflecting device 124. Various ways of communicating the positions of communication nodes to the position determination node may be possible. Additionally, the position determination node may use any of various position methods (e.g., TOA-based positioning, TDOA-based positioning, AOA-based positioning, single-RTT measurement, multi-RTT measurement, or any of various combinations thereof, as previously described) in conjunction with the position of the intelligent reflecting device and the one or more position characteristics of the reflected signal, to determine the position of the target node.

In various embodiments, the position determination node may determine the position of the target node based on receipt of multiple signals. One of the multiple signals may be a signal reflected by an intelligent reflecting device before it is received by the receiving node. In various embodiments, another of the multiple signals may be sent directly by the transmitting node to the receiving node, i.e., without being reflected by any intelligent reflecting devices. In addition or alternatively, another of the multiple signals may be a second reflected signal that is reflected by a second intelligent reflected device. In any of various embodiments, only a single intelligent reflecting device, or two or more (three, four, five, or more) intelligent reflecting devices, may reflect a respective signal that is received by a receiving node, and a position of the target node is determined based on receipt of those reflected signals.

Also, in at least some embodiments where the target node is the transmitting node, multiple receiving nodes (e.g., multiple wireless access nodes 104) may be used to determine the position of the transmitting node. Each of the multiple receiving nodes may receive one or more signals to determine the position of the receiving node. In various of such embodiments, a transmitting node may transmit, such as omni-directionally transmit, at least one signal that is received by at least one intelligent reflecting device. The at least one intelligent reflecting device may reflect the at least one signal to the multiple receiving nodes. The multiple receiving nodes may each determine one or more identifying characteristics and/or one or more position characteristics for each of the signals that it receives, which in turn may be used by the source identification node and the position determination node, to determine the position of the transmitting node.

Additionally, in various embodiments, after the position determination node determines the position of the target node, the determined position may be used in any of various ways. For example, a communication node, such as the receiving node or the transmitting node, may output, such as by displaying, the determined position, such as through execution of an application stored in memory using a processor of the receiving node (such as a navigation application or an application that displays maps and/or positions of communication nodes). Additionally, in various embodiments, if the position determination node is different than the target node, the position determination node may transmit a signal to the target node, notifying the target node of its position. In addition or alternatively, the position determination node can notify any of various communication nodes performing location-based services of the determined position, and the nodes may use the determined position to perform their location-based services. For example, a communication node configured to send advertisements or other content may transmit, to the target node, one or more signals including an advertisement or other content related to the determined location. To illustrate, if the determined position is within a certain distance of a store, a communication node may transmit, to the target node, an advertisement related to the store. As another example, a communication node configured to perform emergency services may use the determined position to notify and/or inform certain emergency services, such as police, firefighters, or emergency medical care, of the target node's location. Various other uses of the determined position are possible.

In various embodiments, a transmitting node may transmit the signal omni-directionally, the receiving node may receive multiple signals based on the transmitted signal, and the position determination node determines the position of the target node based on the multiple received signals. Upon receiving the multiple signals, the receiving node may determine one or more identifying signal characteristics (e.g., frequency, power, duty cycle) and one or more position characteristics for each of the signals. Additionally, the source identification node may determine the source of each received signal based on the characteristics of each signal. For example, the source identification node identifies, for each received signal, the transmitting node from which the receiving node directly received a signal, or an intelligent reflecting device that reflected a signal before being received by the receiving node. The position determination node then determines positions for each of the nodes it identifies, and determines a position of the target node based on the positions of the other nodes that transmitted or reflected a signal, and the position characteristics of the signals received by the receiving node.

Additionally, in various embodiments where TOA-based positioning is used by the position determination node, the receiving node may be synchronized with the transmitting node. In turn, the receiving node may determine absolute transmission delays from the signals that it receives. In other various embodiments where TDOA-based positioning is used by the position determination node, a timing scheme may be used that causes simultaneous transmission and/or reflection of signals to the receiving node, which in turn allows the receiving node to determine pseudo or relative transmission delays among the signals that it receives. For example, in a system where first and second intelligent reflecting devices are to reflect first and second signals, respectively, to a receiving node, a scheduling node (which may be the transmitting node, the receiving node, or any other node in the communication system) may determine times at which the transmitting node is to transmit the first and second signals to the first and second intelligent reflecting devices, respectively, so that the second intelligent reflecting device reflects the second signal at the same time that the first intelligent reflecting device reflects the first signal. In addition or alternatively, if the transmitting node is to transmit a signal directly to the receiving node, then the scheduling node may determine a time at which the transmitting node is to transmit the signal directly to the receiving node so that the transmitting node transmits its signal directly to the receiving node at the same time that the one or more intelligent reflecting devices reflect their respective signals to the receiving node. In various embodiments, the scheduling node may determine the times based on propagation delays and/or distances between the transmitting node and the intelligent reflecting devices.

In addition, in various embodiments, the communication nodes may employ RTT to make time-of-arrival measurements. For example, a receiving node may first transmit, such as omni-directionally transmit, a signal. The transmitting node may receive the signal from the receiving node, which may trigger the transmitting node to send or broadcast a signal that is reflected by one or more intelligent reflecting devices before being received by the receiving node. By first transmitting the signal, and then receiving one or more signals under round trip timing, the receiving node may make transmission delay measurements that are then used to determine the position of the receiving node.

Additionally, in various embodiments, a communication system 100 may have multiple non-target nodes (e.g., one or more wireless access nodes 104, one or more user devices 102, and/or one or more intelligent reflecting devices 124), all of which or less than all which, can be used in, and/or that are candidates to participate in, a positioning session during which signals are transmitted, received, and reflected for determination of the position of a target node. A positioning session control node, which may be the same as or different than the scheduling node, may be configured to track or monitor availabilities or availability statuses of the non-target nodes for a given positioning session. A non-target node may be available to participate in a given positioning session if it is able to transmit or receive (or reflect where the non-target node is an intelligent reflecting device) during the positioning session for determination of a position of a target node. Additionally, a non-target node may be unavailable to participate in a given positioning session if it unable to transmit or receive (or reflect where the non-target node is an intelligent reflecting device) during the positioning session. For example, if a non-target node is already scheduled to be in a different communication session with one or more other nodes or otherwise have no available resources to transmit, receive, or reflect during the time that the positioning session is to occur, the positioning session control node may identify that non-target node as unavailable. Based on the availabilities of the non-target nodes, the positioning session control node may select non-target nodes from among a plurality of non-target nodes, at least one of which may be an intelligent reflecting device, to participate in the positioning session. Upon determining the participating non-target nodes, the scheduling node may determine or schedule transmission times at which the signals are to be transmitted by one or more transmitting nodes.

Additionally, in some example embodiments, different intelligent reflecting devices may reflect according to different reflecting schemes in order to output signals with different characteristics that, in turn, uniquely identify or distinguish the different intelligent reflecting devices from each other. For example, the different reflecting schemes may cause the different intelligent reflecting devices to output reflected signals with different frequencies, different power levels, different duty cycles, or combinations thereof. For at least some example embodiments, the positioning session control node may control the participating reflecting devices to reflect according to associated reflecting schemes so that they output reflected signals that uniquely identify themselves.

In other example embodiments, different intelligent reflecting devices may output reflected signals with different frequencies, such as different carrier frequencies, without or independent of having different reflection schemes. For example, different intelligent reflecting devices may have structural differences, such as different antenna element designs, that cause or allow them to reflect, or otherwise operate, in different frequencies. For such embodiments, the different intelligent reflecting devices may reflect signals with different frequencies (e.g., different carrier frequencies) that uniquely identify the different intelligent reflecting devices, without the different intelligent reflecting devices having set their respective surface elements according to different reflection schemes. In turn, the source identification node may identify the intelligent reflecting devices based on the different frequencies, e.g., the different carrier frequencies, of the signals received by the receiving node. Other example embodiments may employ fingerprinting techniques to uniquely identify the intelligent reflecting devices and differentiate between different intelligent reflecting devices.

As mentioned, the target node may be either a receiving node or a transmitting node. For embodiments where the target node is a receiving node, a transmitting node may transmit a signal to an intelligent reflecting device, which in turn reflects the signal to the receiving node. A position determination node then determines a position of the reflecting node based on the identity of the intelligent reflecting device that reflected the signal to the receiving node, as previously described. Additionally, for embodiments where the target node is a transmitting node, the transmitting node may transmit a signal to an intelligent reflecting device, which in turn reflects the signal to the receiving node. A position determination node then determines a position of the transmitting node based on the identity of the intelligent reflecting device that reflected the signal to the receiving node. Any of various numbers of user devices 102, wireless access nodes 104, and/or intelligent reflecting devices 124 may be used as non-target nodes during a positioning session to transmit, receive, or reflect in order to determine a position of a target node, whether the target node is a receiving node or a transmitting node during a position session.

Figure 5:
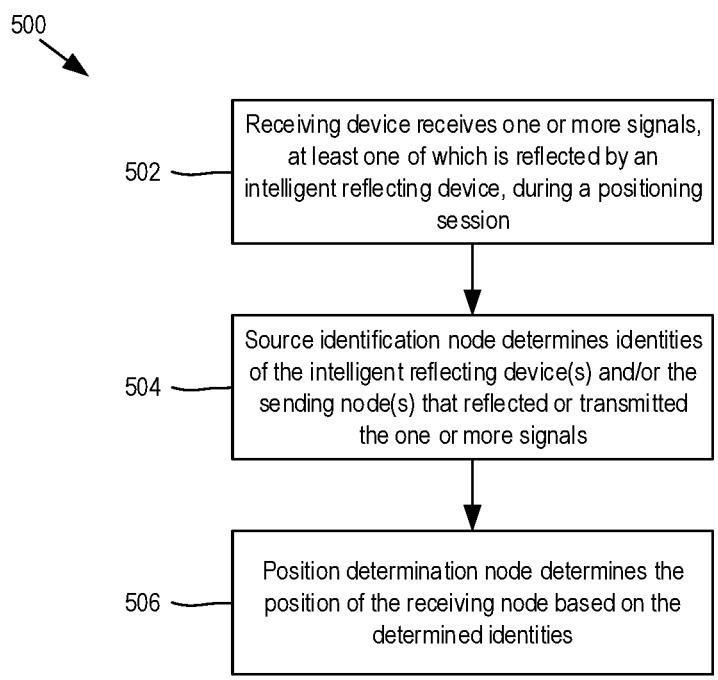
FIG. 5 shows a flow chart of an example positioning method for wireless communication.

FIG. 5 is an example flow chart 500 of an example positioning method for wireless communication. At block 502, a receiving node may receive one or more signals during a position session for determining a position of a target node. Example receiving nodes may include a user device 102 or a wireless access node 104, although other types of communication nodes for the receiving device may be possible. At least one of the signals that the receiving device receives was reflected by an intelligent reflecting device before it is received by the receiving node. In various embodiments, the one or more signals includes multiple signals. For at least some of these embodiments, at least two of the multiple signals are reflected by two intelligent reflecting devices before being received by the receiving node. For other of these embodiments, at least one of the multiple signals is transmitted directly from a sending to the receiving node.

Also, in various embodiments, a positioning session control node may determine one or more non-target nodes to participate in the positioning session. The positioning control node may make the determination based on availability statuses of user devices 102, wireless access nodes 104, and intelligent reflecting devices 124, other than the target node, that may be candidates for participating in the positioning session. Additionally, in various embodiments, a scheduling node may determine one or more times at which a transmitting node is to transmit or broadcast a signal for reflection by at least one intelligent reflecting device. In particular example embodiments, where TDOA-based positioning is to be employed, the scheduling node may determine times for a transmitting node to transmit signals to participating intelligent reflecting devices such that all participating intelligent reflecting devices reflect signals to the receiving node at the same time.

Also, in various embodiments, for the intelligent reflecting devices that participate in the positioning session, the positioning session control node may control the participating intelligent reflecting devices so that they reflect with reflection schemes that will, in turn, cause the participating intelligent reflecting devices to output reflected signals each with one or more identification characteristics that identifies the intelligent reflecting device that output the signal. In other embodiments, the intelligent reflecting devices may output reflected signals with different frequencies, such as different carrier frequencies, that identify the intelligent reflecting devices independent of reflection schemes.

Also, in various embodiments, the receiving node may transmit one or more signals in order to trigger one or more transmitting nodes to transmit signals to the receiving nodes. Such initial transmission by the receiving node may be in accordance with round trip time measurements schemes that allow the receiving node to determine position characteristics of received signals, such as time of arrival.

At block 504, a source identification node determines identities of the participating non-target nodes, including identities of participating intelligent reflecting device(s), participating in the positioning session based on the one or more signals received by the receiving node. In various embodiments, the receiving node may determine one or more identification characteristics of the received signals, such as frequency, power, and/or duty cycle, which in turn may identify the transmitting node(s) and/or the intelligent reflecting device(s) that transmitted or reflected a signal to the receiving node.

At block 506, a position determination node may determine a position of the target node based on the determined identities. In various embodiments, the position determination node may determine positions of the participating non-target nodes based on the determined identities. For at least some embodiments, the position determination node may receive a data packet that indicates positions of the participating nodes. In addition or alternatively, an intelligent reflecting device may reflect a signal to a receiving node with a characteristic that identifies the position of the intelligent reflecting device. Additionally, the receiving node may determine one or more positioning characteristics of the received signals, and the position determination node may use the position characteristics as inputs to a positioning method, such as TOA-based positioning, TDOA-based positioning, or AOA-based positioning, as non-limiting examples. In other example embodiments, an identity of a participating intelligent reflecting device may indicate a particular cell in which the target node is located. For such embodiments, the particular cell may provide a position, e.g., a rough position, of the target node.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, the method comprising:
   receiving, by a receiving node, a first signal reflected by an intelligent reflecting device;
   determining, by a source identification node, an identity of the intelligent reflecting device based on the first signal after being reflected by the intelligent reflecting device; and
   identifying, by a position determination node, a position of a target node based on the identity of the intelligent reflecting device and a position of a transmitting node that transmits the first signal before being reflected by the intelligent reflecting device,
wherein identifying the position of the target node is further based on a second signal received directly from the transmitting node.

2. The method of claim 1, wherein identifying the position of the target node based on the identity of the intelligent reflecting device comprises:
determining, by the position determination node, a position of the intelligent reflecting device based on the identity of the intelligent reflecting device; and
determining, by the position determination node, the position of the target node based on the position of the intelligent reflecting device and the signal.

3. The method of claim 1, wherein the intelligent reflecting device comprises a first intelligent reflecting device and the signal comprises a first signal, the method further comprising:
receiving, by the receiving node, a second third signal reflected by a second intelligent reflecting device; and
determining, by the source identification node, an identity of the second intelligent reflecting device based on the second third signal,
wherein identifying the position of the target node is further based on the identity of the second intelligent reflecting device and the second third signal.

4. The method of claim 1, wherein identifying the position of the receiving node based on the identity of the intelligent reflecting device and the first signal is further according to at least one of: time of arrival (TOA)-based positioning, time difference of arrival (TDOA)-based positioning, or angle of arrival (AOA)-based positioning, single-round trip time measurement, multi-round trip time measurement, or fingerprint-based positioning.

5. The method of claim 4, wherein TDOA-based positioning is used to identify the position of the target node, wherein the signal comprises a first signal, the method further comprising:
determining, by a scheduling node, a first time that a transmitting node is to transmit the first signal to the intelligent reflecting device; and
determining, by the scheduling node, a second time that the transmitting node is to transmit the second signal directly to the receiving node, the second time being a time that the intelligent reflecting device is to reflect the first signal.

6. The method of claim 4, wherein TDOA-based positioning is used to identify the position of the receiving node, wherein the signal comprises a first signal, wherein the intelligent reflecting device comprises a first intelligent reflecting device, the method further comprising:
determining, by the scheduling node, a first time that the transmitting node is to transmit the first signal to the intelligent reflecting device; and
determining, by the scheduling node, a second time that the transmitting node is to transmit a second third signal to a second intelligent reflecting device, the second time being a time determined to cause the second intelligent reflecting device to reflect the second third signal at a same time that the first intelligent reflecting device reflects the first signal.

7. The method of claim 1, wherein the signal comprises a first signal, the method further comprising:
transmitting, by the receiving node, a second third signal before receiving the first signal; and
transmitting, by the transmitting node, the first signal to the intelligent reflecting device in response to receiving the second third signal.

8. The method of claim 1, further comprising:
receiving, by the position determination node, at least one data packet indicating position information of the intelligent reflecting device.

9. The method of claim 1, wherein the signal comprises a first signal, the method further comprising:
receiving, by the receiving node, a second third signal from the intelligent reflecting device, wherein an identification characteristic of the second third signal indicates a position of the intelligent reflecting device,
wherein the identification characteristic of the second third signal comprises at least one of a frequency, a power, or a duty cycle.

10. The method of claim 1, further comprising:
determining, by a positioning session control node, one or more intelligent reflecting devices, from among a plurality of intelligent reflecting devices, to participate in a positioning session to identify the position of the receiving node by determining availabilities during the positioning session for the plurality of intelligent reflecting devices.

11. The method of claim 1, wherein the identity of the intelligent reflecting device indicates a cell in which the target node is located.

12. The method of claim 1, wherein the signal comprises a first signal and the intelligent reflecting device comprises a first intelligent reflecting device, wherein determining the identity of the first intelligent reflecting device based on the first signal comprises determining, by the first node, the identity of the first intelligent reflecting device based on a first frequency of the first signal, the method further comprising:
receiving, by the receiving node, a second third signal reflected by a second intelligent reflecting device; and
determining, by the receiving node, an identity of a second intelligent reflecting device based on a second frequency of the second third signal,
wherein identifying the position of the target node is further based on the identity of the second intelligent reflecting device.

13. The method of claim 1, wherein determining the identity of the intelligent reflecting device comprises determining, by the receiving node, an identifying characteristic of the signal, wherein the identifying characteristic comprises at least one of a frequency, a power, or a duty cycle.

14. The method of claim 1, wherein the position determination node comprises the receiving node.

15. The method of claim 1, wherein the position determination node comprises a node in a communication system separate from receiving node.

16. The method of claim 1, wherein the target node comprises the receiving node.

17. The method of claim 1, wherein the target node comprises the transmitting node that transmitted the first signal to the intelligent reflecting device before the signal is reflected to the receiving node.

18. A system comprising:
a receiving node configured to receive a first signal reflected by a first intelligent reflecting device and a second signal reflected by a second intelligent reflecting device;
a source identification node configured to:

determine an identity of the intelligent reflecting device based on a first frequency of the first signal after being reflected by the first intelligent reflecting device; and determine an identity of the second intelligent reflecting device based on a second frequency of the second signal a position determination node configured to identify a position of a target node based on the identity of the first intelligent reflecting device and the identity of the second intelligent reflecting device.

19. A method for wireless communication, the method comprising:

receiving, by a receiving node, a first signal reflected by a first intelligent reflecting device;

determining, by a source identification node, an identity of the first intelligent reflecting device based on a first frequency of the first signal after being reflected by the intelligent reflecting device;

receiving, by the receiving node, a second signal reflected by a second intelligent reflecting device;

determining, by the source identification node, an identity of the second intelligent reflecting device based on a second frequency of the second signal; and identifying, by a position determination node, a position of a target node based on the identity of the first intelligent reflecting device and the identity of the second intelligent reflecting device.

* * * * *